United States Patent
Murata et al.

(10) Patent No.: US 7,158,455 B2
(45) Date of Patent: Jan. 2, 2007

(54) SERVO ERROR DETECTING DEVICE FOR OPTICAL DISK

(75) Inventors: Hironobu Murata, Kanagawa (JP); Takashi Aoe, Kanagawa (JP); Koyu Yamanoi, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/339,376

(22) Filed: Jan. 9, 2003

(65) Prior Publication Data

US 2003/0133374 A1 Jul. 17, 2003

(30) Foreign Application Priority Data

Jan. 9, 2002 (JP) .............................. 2002-002581

(51) Int. Cl.
*G11B 7/004* (2006.01)

(52) U.S. Cl. ................. 369/44.41; 369/53.28

(58) Field of Classification Search ............ 369/44.35, 369/44.41, 53.28, 44.14, 44.11, 53.31, 53.35, 369/53.44
See application file for complete search history.

(56) References Cited

U.S. PATENT DOCUMENTS

| | | | | |
|---|---|---|---|---|
| 4,503,324 A * | 3/1985 | Yokota | ................. | 250/201.5 |
| 4,651,314 A * | 3/1987 | Yoshikawa et al. | ...... | 369/44.28 |
| 4,998,234 A * | 3/1991 | Rees et al. | ................. | 369/44.27 |
| 5,216,646 A * | 6/1993 | Imanaka et al. | ........ | 369/44.26 |
| 5,408,452 A * | 4/1995 | Sakemoto et al. | ....... | 369/44.26 |
| 6,044,050 A * | 3/2000 | Kuroiwa | ................... | 369/44.41 |
| 6,233,208 B1 * | 5/2001 | Sasaki | ..................... | 369/44.29 |
| 6,285,636 B1 * | 9/2001 | Tay et al. | ............... | 369/44.41 |
| 6,418,105 B1 * | 7/2002 | Horino et al. | ........... | 369/53.37 |
| 6,781,930 B1 * | 8/2004 | Fukumoto | ................ | 369/44.32 |
| 2002/0036967 A1 * | 3/2002 | Osada | ...................... | 369/53.28 |

* cited by examiner

*Primary Examiner*—William Korzuch
*Assistant Examiner*—Michael V. Battaglia
(74) *Attorney, Agent, or Firm*—W. James Brady; Frederick J. Telecky, Jr.

(57) ABSTRACT

Servo error signal circuitry apparatus and methods are described. The difference between two bottom envelope signals SEbtm and SFbtm is calculated by a subtracter (40) to generate a difference signal (SEbtm−SFbtm). The difference signal (SEbtm−SFbtm) is input as an alignment signal (AL) to an equalizer (42) and as a basic tracking error signal to the positive input terminal of a second subtracter (52). On the other hand, the difference between two top envelope signals SEtop and SFtop is calculated by a third subtracter (48) to generate a difference signal (SEtop−SFtop). The signal K(SEtop−SFtop) obtained by multiplying a coefficient K with the difference signal using a coefficient multiplier (50) is input to the negative input terminal of the second subtracter (52). The difference signal {(SEbtm−SFbtm)−K(SEtop−SFtop)} output from the second subtracter (52) is used as an offset corrected tracking error signal.

2 Claims, 12 Drawing Sheets

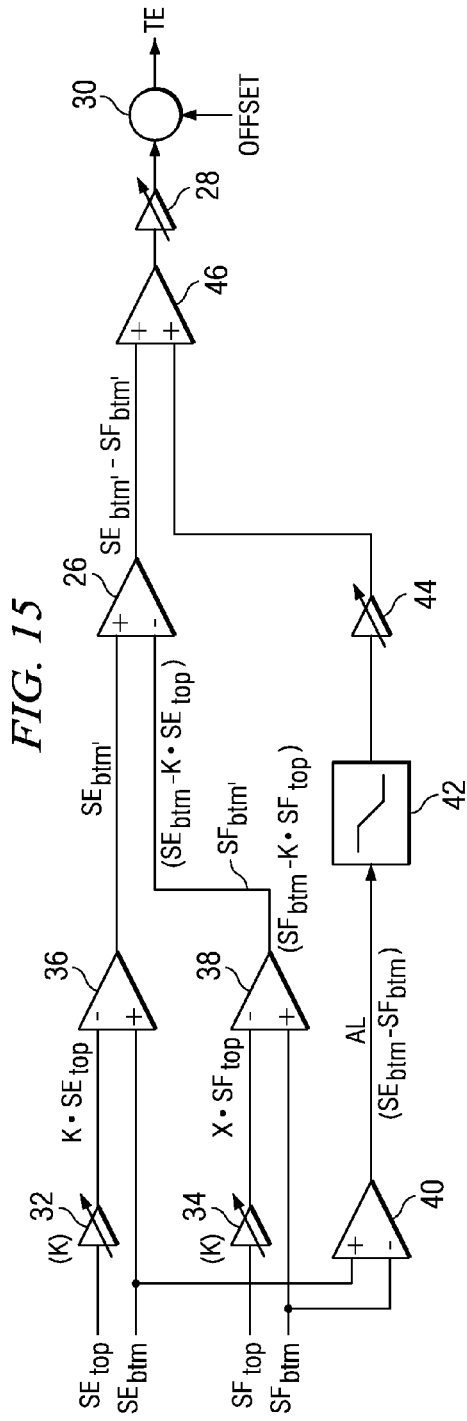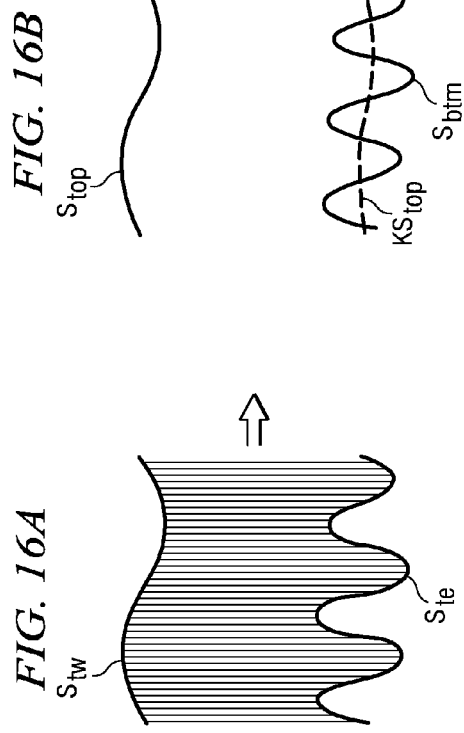

$(SE_{btm} - SF_{btm}) - K(SE_{top} - SF_{top}) = (SE_{btm} - K \cdot SE_{top}) - (SF_{btm} - K \cdot SE_{top})$ $f(t) = A_{RF} \cos \omega_{RF} t + A_{MOD} \cos \omega_{MOD} t$ $f(t) = A_{RF} \cos \omega_{RF} t \times (1 - A_{MOD} \cos \omega_{MOD} t) + A_{RF} \cdot A_{MOD} \cos \omega_{MOD} t$

SERVO ERROR DETECTING DEVICE FOR OPTICAL DISK

FIELD OF THE INVENTION

The present invention relates generally to a servo mechanism in an optical disk device; and, in particular, a servo error detecting device and method used for detecting positional or optical errors of the positioning of a light beam used for reading an optical disk.

BACKGROUND OF THE INVENTION

FIG. 1 shows the basic configuration of an optical disk device.

Optical disk 10 is a toroidal circular disk with a central hole. Arrays of bits are arranged in a concentric (specifically, spiral) pit pattern to form tracks on the signal recording side 10a (underside as shown in FIG. 1) of the disk. During playback, spindle motor 12 drives optical disk 10 to rotate at a prescribed linear velocity using, for example, the CLV (Constant Linear Velocity) method.

A light pick-up 14 that can move in the radial direction of the disk is set opposite the signal recording side 10a of optical disk 10. Light pick-up 14 focuses and radiates a laser beam LB onto the signal recording side 10a of optical disk 10, detects the light beam reflected from signal recording side 10a, performs photoelectric transformation, and generates an electric signal having a waveform corresponding to the embossment pattern of the pit arrays. The electric signal output from light pick-up 14 is sent to an RF amplifier 16. RF amplifier 16 generates a reproduced data signal SM, as well as a tracking error signal TE and a focus error signal FE. The reproduced data signal SM output from RF amplifier 16 is input to a data signal processing unit (not shown in the figure), where decoding, error correction, or other signal processing is performed. A servo error signal, such as the tracking error signal TE or focus error signal FE, output from RF amplifier 16 is sent to a pick-up servo 18. Pick-up servo 18 performs tracking control for positioning or tracking the beam spot SP of laser beam LB on the track (pit array) and also performs focusing control for focusing beam spot SP to the size of the pit.

FIG. 2 shows an example of the light detector incorporated as the photoelectric transformation part in light pick-up 14. The light detector is a four-division type used for a push-pull system. Four photoelectric transformation units or light receiving regions A, B, C, D made of electrodes, for example, are arranged in adjoining abutting four quadrant relationship. The beam LB' of light returning or reflected from the signal recording side 10a of optical disk 10 is focused and made incident onto the light receiving regions A, B, C, D of the light detector through optical lenses or other detecting optical systems. Electric signals (referred to as RF signals hereinafter) SA, SB, SC, SD are generated corresponding to the quantity or intensity of light received in each of light receiving regions A, B, C, D. The RF signals are typically voltage signals obtained after I–V conversion performed in pick-up 14. A reference voltage Vc applied as an external bias voltage to the pick-up is used as the reference level. FIGS. 3A–3D schematically illustrate the waveforms of RF signals SA, SB, SC, and SD.

The RF signals SA and SD obtained from light receiving regions A and D on the left side of the boundary that is the central line in parallel with the track direction have the same phase. The RF signals SB and SC obtained from the light receiving regions B and C on the right side of the same boundary also have the same phase. The RF signals SA, SD have opposite phases from RF signals SB, SC.

When the beam spot SP of laser beam LB on signal recording side 10a of optical disk 10 is positioned on the track center, that is, when it is on track, the light beam LB' reflected from signal recording side 10a is incident onto the central part of the light receiving regions A, B, C, D of the light detector. The level of the RF signals SA and SD obtained from the light receiving regions A and D on the left side is almost the same as that of the RF signals SB and SC obtained from the light receiving regions B and C on the right side.

However, when beam spot SP shifts from the center of the track in the radial direction, the reflected light beam LB' is incident onto a position that deviates to the left or right from the central part of the light receiving regions A, B, C, D of the light detector. The level of the RF signals SA and SD obtained from the light receiving regions A and D on the left side becomes different from that of the RF signals SB and SC obtained from the light receiving regions B and C on the right side. For example, if beam spot SP shifts inward in the radial direction, the focusing position of the reflected light beam LB' is offset to the left side of light receiving regions A, B, C, D. The level of the RF signals SA and SD obtained from the light receiving regions A and D on the left side becomes higher than that when the beam spot is on track. On the other hand, the level of the RF signals SB and SC on the side of right-side light receiving regions B and C becomes lower than that when the beam spot is on track. If beam spot SP shifts outward in the radial direction, the focusing position of reflected light beam LB' is offset to the right side of the light receiving regions A, B, C, D. The level of the RF signals SB and SC obtained from the right-side light receiving regions B and C becomes higher than that when the beam spot is on track, while the level of the RF signals SA and SD obtained from the left-side light receiving regions A and D becomes lower than that when the beam spot is on track.

FIG. 4 (prior art) shows the basic configuration of a conventional tracking error detecting circuit in a push-pull system. The tracking error detecting circuit has a pair of adders 200 and 202, a subtracter 204, and a low-pass filter 206. Adder 200 calculates the sum (SA+SD) of the RF signals SA and SD obtained from the left-side light receiving regions A and D of the light detector (FIG. 2), while the other adder 202 calculates the sum (SB+SC) of the RF signals SB and SC obtained from the right-side light receiving regions B and C. Subtracter 204 calculates the difference {(SA+SD)−(SB+SC)} of the two signals. Low-pass filter 206 eliminates the high-frequency component, that is, the RF signal component from the difference signal output from subtracter 204 and outputs tracking error signal TE.

FIG. 5 (prior art) shows the basic configuration of a conventional focus error detecting circuit using the astigmatism method. The focus error detecting circuit has a pair of adders 208 and 210, as well as a subtracter circuit 212. Adder 208 calculates the sum (SA+SC) of the RF signals SA and SC obtained from light receiving regions A and C positioned on one of the diagonals of the light detector (FIG. 2). The other adder 210 calculates the sum (SB+SD) of the RF signals SB and SD obtained from the light receiving regions B and D positioned on the other diagonal. Subtracter 212 calculates the difference {(SA+SC)−(SB+SD)} of the two signals. The difference signal is taken as the focus error signal FE. The output signal FE of subtracter 212 can also pass through an amplifier or a low-pass filter (not shown in the figure).

According to the astigmatism method, when the objective lens in light pick-up 14 is too close to optical disk 10, the spot of the reflected light beam focused onto the light receiving region A, B, C, D of the light detector becomes an elliptic shape that is stretched on the side of light receiving regions A and C and is compressed on the side of light receiving regions B and D, as shown by broken line LBa in FIG. 6. On the other hand, when the objective lens is too far away from optical disk 10, the spot of the reflected light beam focused in the light receiving region A, B, C, D of the light detector becomes an elliptic shape that is stretched on the side of light receiving regions B and D and is compressed on the side of light receiving regions A and C, as shown by dot-dashed line LBb in FIG. 6.

In an optical disk device, the accuracy of a servo error signal, such as the tracking error signal TE or the focus error signal FE, controls the accuracy of the servo. For example, for a tracking servo, when the light pick-up is jump-shifted from the track during the current tracking to another track, if the accuracy of the tracking error signal is low, a long time will be required from applying the tracking servo near the targeted track until reaching the state of on-track, or it is difficult to correctly perform an on-track operation.

FIGS. 7A and 7B schematically illustrate the waveforms of RF signals SA, SB, SC, SD obtained from light receiving regions A, B, C, D of the light detector (FIG. 2) during tracking. The reason for the sinusoidal level change Ste at the bottom of the waveform of each RF signal is that the beam spot SP of the laser beam LB radiated from light pick-up 14 onto the signal recording side 10a of optical disk 10 crosses alternately between the track part (pit) and the intertrack mirror part (flat part where there is no pit) in the radial direction at a certain velocity. In other words, the reason is that when the beam spot SP crosses the track part, the intensity modulation caused by the pits or the diffraction is maximized (as a result, the light intensity of the reflected light beam is minimized), and when the beam spot SP crosses the mirror part, the intensity modulation is minimized (as a result, the light intensity of the reflected light beam is maximized). Usually, even when the beam spot SP is at the center of a mirror part, it partially overlaps the adjacent track, and intensity modulation occurs in the overlapped part. As a result, for the RF signal, the maximum point of the bottom level is not as high as the top level, and there is a high-frequency modulation component even near the maximum point.

In a conventional tracking error detecting circuit (FIG. 4), operation circuits 200, 202, 204 perform the required operation (push-pull operation) for the RF signals SA, SB, SC, SD obtained from the light receiving regions A, B, C, D of the light detector, respectively. In this way, tracking error signal TE that indicates the positional error of beam spot SP in the radial direction can be obtained. However, whether in low-speed or high-speed playback, as a result of passing through the low-pass filter, the tracking signal TE is attenuated significantly (by about one-half), leading to deterioration in the SN (signal-to-noise) characteristic (see FIGS. 8 and 9). The reason for this is that the top envelope component of the RF signal is almost flat. Also, in the case of low-speed playback, the frequency of the RF signal is relatively close to that of the tracking error signal. It is difficult to separate the two signals using a low-pass filter. The RF signal component tends to be left over in the tracking error signal TE as shown in FIG. 8.

In general optical disks, such as a CD (Compact Disc) and a DVD (Digital Versatile Disk), EFM (eight to fourteen modulation) or EFM Plus is usually used as the modulation method for the data recorded on the tracks. The length of the pits is limited to the range of 3T–11T (T is the length of one bit) in order to satisfy the [2, 10] RLL (Run-Length Limited) code condition, that is, the length of "0" is in the range of 2–11. Therefore, for example, in a CD, the frequency of the channel clock is 4.32 MHz at double speed. However, the frequency of the RF signal reaches the highest level of 720 kHz in the case of 3T/3T. It is as low as 196 kHz in the case of 11T/11T. In order to perform tracking servo correctly, such an RF signal component in the tracking error signal is desired to be so small that it can be ignored.

In the conventional tracking error detecting circuit, however, it is difficult to separate or cut the RF signal component with a frequency of about 196 kHz from the tracking error signal TE obtained from the tracking modulation component Ste that usually has a frequency of tens of kHz by passing the signal through low-pass filter 106.

Also, in order to match the input range of the AD converter (not shown in the figure) in a later stage during conversion to digital signals, the amplitude of the tracking error signal TE is increased by using operation circuits 200, 202, 204 or a special gain control amplifier (not shown in the figure). However, since the RF signal component is also amplified, the gain cannot be increased sufficiently. In addition, the accuracy of the digital signal becomes low due to mixing of the RF signal component.

On the other hand, during high-speed playback performed at 30-fold speed for a CD or 6-fold speed for a DVD, the band of the RF signal becomes 10 MHz or higher. When the band of operation circuits 200, 202, 204 is only several MHz, these operation circuits act as low-pass filters. They not only attenuate the RF signal component but also reduce the tracking error signal TE by half to its original form, that is, to the tracking modulation component Ste. As a result, SN becomes as low as 6 dB.

In a conventional focus error detecting circuit (FIG. 5), the accuracy of the focus error signal and SN are also low. Other servo error detecting systems using light detectors other than the four-division type also have the same problem.

There is a need to solve the problem of the conventional technology by providing a servo error detecting device for an optical disk that can generate error signals for servo, from which the high-frequency component can be effectively cut off.

There is also a need to provide a servo error detecting device for an optical disk that can generate error signals for a servo with a high SN ratio.

SUMMARY OF THE INVENTION

In accordance with one aspect of the invention, a first implementation of servo error detecting device for an optical disk is used to detect errors on the positional or optical servo of a light beam on the signal recording side of an optical disk. The servo error detecting device has an optical detector that receives a light beam reflected from the signal recording side of the optical disk in one or multiple light receiving regions and outputs an electric signal corresponding to the light intensity of the reflected light beam, an envelope detector that detects the top envelope and/or bottom envelope of each of the electric signals and generates a top envelope signal and/or bottom envelope signal representative of the waveform of the top envelope and/or bottom envelope, and a servo error signal generator that processes the top envelope signal and/or bottom envelope signal to generate a servo error signal.

In the described first servo error detecting device, appropriate processing is performed to convert the high-frequency electric signal output from each light receiving region of the light detector to a low-frequency top envelope signal and/or bottom envelope signal, effectively removing or rendering negligible the high-frequency component, and enabling a servo error signal with an excellent SN characteristic to be obtained.

In one embodiment, a servo error signal generator calculates the difference between the bottom envelope signal obtained from a first light receiving region and the bottom envelope signal obtained from a second light receiving region to generate a tracking error signal that indicates the tracking error. In order to compensate the offset caused by displacement of the optical disk or dislocation of the optical system, a bottom envelope signal correcting circuit is used that corrects each of the bottom envelope signals obtained from the first and second light receiving regions by subtracting the corresponding top envelope signal from it. The bottom envelope signal correction may be done by a first coefficient multiplier that multiples a desired coefficient with the top envelope signal before the subtraction.

The servo error detecting device may also have a top envelope differential signal generator, which calculates the difference between the top envelope signals obtained from the first and second light receiving regions to generate a top envelope differential signal, and have offset correction to correct the offset of the tracking error signal depending on the top envelope differential signal. In this case, the servo error detecting device may have a second coefficient multiplier that multiplies a desired coefficient with each of the top envelope signals or a third coefficient multiplier that multiplies a desired coefficient with the top envelope differential signal.

In another embodiment, the servo error signal generator may have an equalizer circuit, which selectively amplifies or attenuates a desired frequency band component for the difference signal obtained by calculating the difference between the bottom envelope signal obtained from the first light receiving region and the bottom envelope signal obtained from the second light receiving region, and utilize frequency characteristic adjustment to adjust the frequency characteristic of the tracking error signal based on the output signal of the equalizer circuit.

In accordance with another aspect of the invention, a second implementation of servo error detecting device for an optical disk provided is used to detect errors on the positional or optical servo of a light beam on the signal recording side of an optical disk. The servo error detecting device has an optical detecting means that receives a light beam reflected from the signal recording side of the optical disk in a first group and a second group of light receiving regions and outputs multiple electric signals corresponding to the light intensity of the reflected light beam in each of the light receiving regions of each group, an envelope detector that detects the top envelopes and/or bottom envelopes of the multiple electric signals and generates multiple top envelope signals and/or bottom envelope signals representative of the waveform of each of the top envelopes and/or bottom envelopes, and a servo error signal generator that processes the multiple top envelope signals and/or bottom envelope signals to generate servo error signals.

In the described second servo error detecting device, appropriate processing is performed to convert the multiple high-frequency electric signals output from each of the first and second groups of light receiving regions of the light detector to a low-frequency top envelope signal and/or bottom envelope signal, effectively removing or rendering negligible the high-frequency component, and enabling a servo error signal with an excellent SN characteristic to be obtained.

In a described embodiment, the first and second groups of light receiving regions are arranged in an opposite phase mode using a push-pull method. The servo error signal generator has a first adder that calculates the sum of the multiple bottom envelope signals obtained from the first group of light receiving regions to generate a first sum signal, a second adder that calculates the sum of the multiple bottom envelope signals obtained from the second group of light receiving regions to generate a second sum signal, and a tracking error signal generator that calculates the difference between the first and second signals to generate a tracking error signal that indicates the tracking error.

In another embodiment, the first and second groups of light receiving regions are arranged in an opposite phase mode using an astigmatism method. The servo error signal generator has a first adder that calculates the sum of the multiple bottom envelope signals obtained from the first group of light receiving regions to generate a first sum signal, a second adder that calculates the sum of the multiple bottom envelope signals obtained from the second group of light receiving regions to generate a second sum signal, and a focus error signal generator that calculates the difference between the first and second sum signals to generate a focus error signal that indicates the focusing error.

In another aspect of the invention, a third implementation of servo error detecting device is used to detect errors on the positional or optical servo of a light beam on the signal recording side of an optical disk. The servo error detecting device has an optical detector that receives a light beam reflected from the signal recording side of the optical disk in a first group and a second group of light receiving regions and outputs multiple electric signals corresponding to the light intensity of the reflected light beam in each of the light receiving regions of each group, a first electric signal combiner combines the multiple electric signals obtained from the first group of light receiving regions to generate a first combined electric signal, a second electric signal combiner combines the multiple electric signals obtained from the second group of light receiving regions to generate a second combined electric signal, an envelope detector detects the top envelopes and/or bottom envelopes of the first and second combined electric signals and generates multiple top envelope signals and/or button signals representative of the waveform of each of the top envelopes and/or bottom envelopes, and a servo error signal generator processes the multiple top envelope signals and/or bottom envelope signals to generate desired servo error signals.

In the described third servo error detecting device, the multiple high-frequency electric signals output from each of the first and second groups of light receiving regions of the light detector are combined for each group, and a required processing is carried out to convert each of the combined signals to a low-frequency top envelope signal and/or bottom envelope signal. High-frequency components are minimized, and a servo error signal with an excellent SN characteristic can be obtained.

BRIEF DESCRIPTION OF THE DRAWINGS

FIG. 15 is a block diagram illustrating an example of another embodiment of a tracking error detecting circuit.

FIGS. 16A–16C are waveform diagrams illustrating the operation of the tracking error detecting circuit of FIG. 15.

DETAILED DESCRIPTION OF EMBODIMENTS

Figure 1:
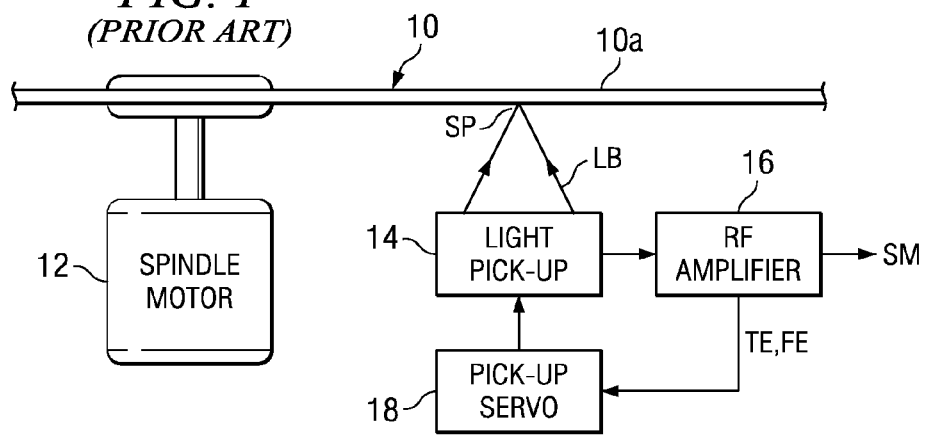
FIG. 1 is a schematic block diagram view of an optical disk device to which the present invention finds application.
Figure 2:
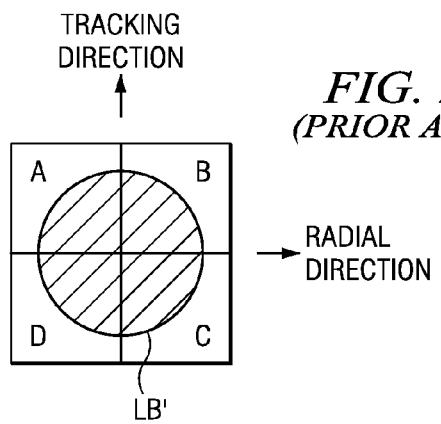
FIG. 2 is a schematic plan view illustrating an example of a light detector usable with the optical disk device of FIG. 1.
Figure 3A:
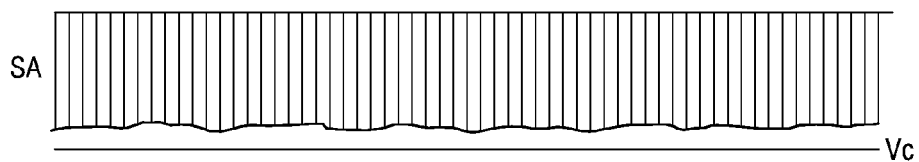
FIGS. 3A–3D are diagrams illustrating the waveforms of the electric signals obtained from the light receiving regions of the light detectors of FIG. 2.
Figure 3B:
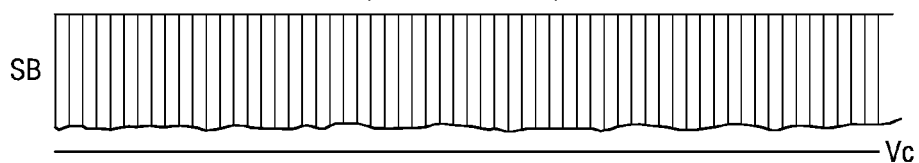
Figure 3C:
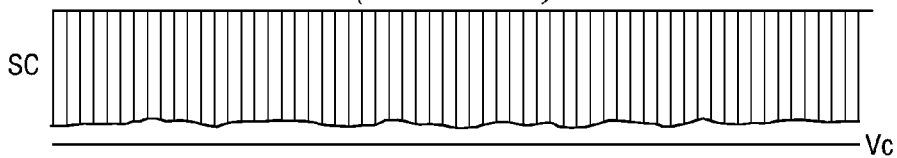
Figure 3D:
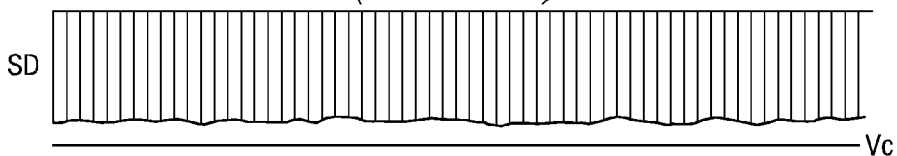
Figure 4:
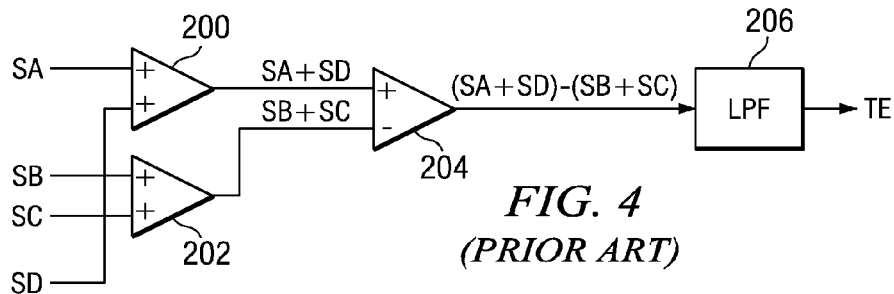
FIG. 4 (prior art) is a block diagram of an example of a conventional tracking error detecting circuit.
Figure 5:
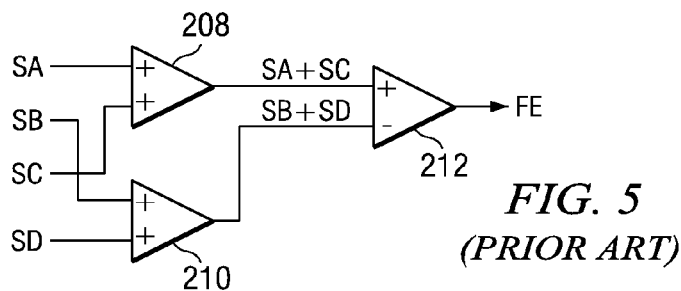
FIG. 5 (prior art) is a block diagram of another example of a conventional tracking error detecting circuit.
Figure 6:
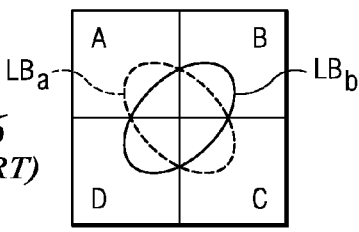
FIG. 6 is a schematic plan view illustrating the light receiving state of a light detector corresponding to focus error in the astigmatism method.
Figure 7A:
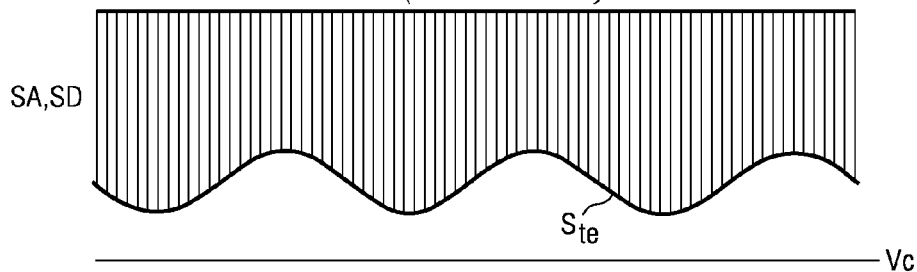
FIGS. 7A and 7B are diagrams illustrating the waveforms of the electric signals obtained from each light receiving regions of the light detectors of FIG. 2 during tracking.
Figure 7B:
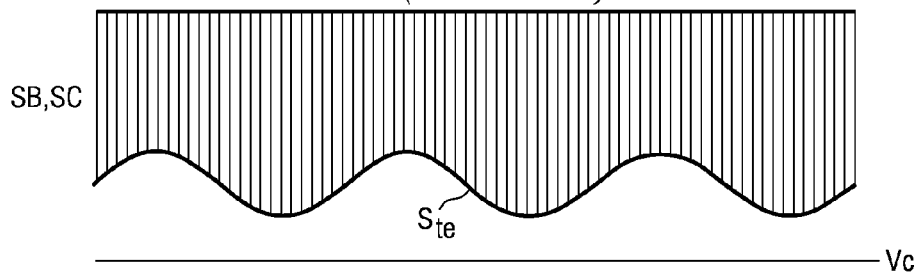
Figure 8:
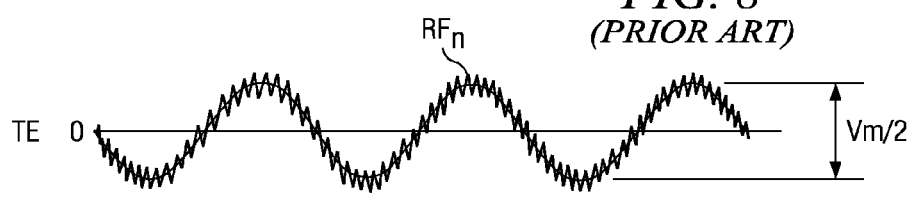
FIG. 8 is a waveform diagram illustrating a problem experienced with the conventional tracking error detecting circuit of FIG. 4.
Figure 9:
FIG. 9 is a waveform diagram illustrating another problem experienced with the tracking error detecting circuit of FIG. 4.

Implementations of the invention are described with reference to the accompanying figures and in the context of an optical disk apparatus having the basic configuration previously described and shown in FIG. 1.

Figure 10:
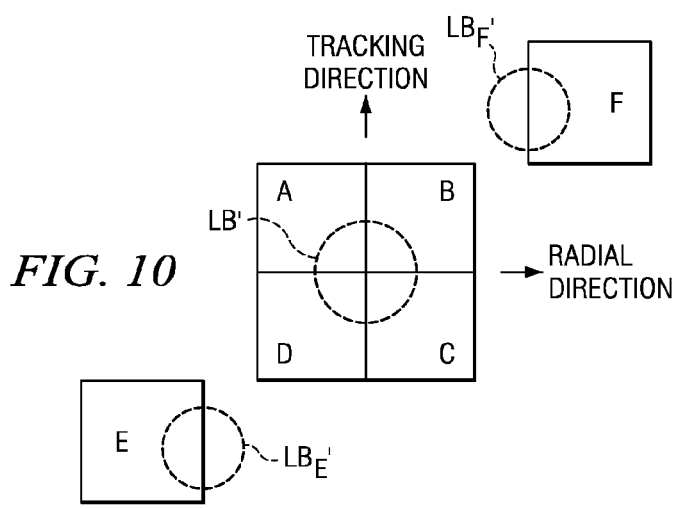
FIG. 10 is a schematic plan view illustrating an example of arrangement of light receiving regions of a light detector usable with a described servo error detecting device implementation of the invention.

A first implementation utilizes an arrangement of light receiving regions of a light detector shown in FIG. 10. Such light detector is typical of a so-called three-beam system. A pair of light receiving regions E and F are arranged at a prescribed distance on the left and right sides of the four-division light receiving regions A, B, C, D. In the three-beam system, a pair of secondary beams $LB_E$ and $LB_F$ are focused and radiated in the radial direction from light pick-up 14 (see FIG. 1) to the signal recording side 10a of optical disk 10 at a prescribed interval. The main beam LB is sandwiched between them. The beam LB' of the light reflected from signal recording side 10a corresponding to the main beam LB is focused and incident onto the central light receiving regions A, B, C, D. The beams $LB_E'$ and $LB_F'$ of the returning or reflected light corresponding to secondary beams $LB_E'$ and $LB_F'$ are focused and incident onto the light receiving regions E and F on the left and right sides, respectively. Light receiving regions A, B, C, D, E, F generate electric signals or RF signals SA, SB, SC, SD, SE, SF, respectively, corresponding to the quantity or intensity of the received light. These RF signals may be voltage signals obtained as a result of I–V conversion performed in pick-up 14. The level of a reference voltage Vc applied as a bias voltage from outside to the pickup is used as the reference.

Figure 11:
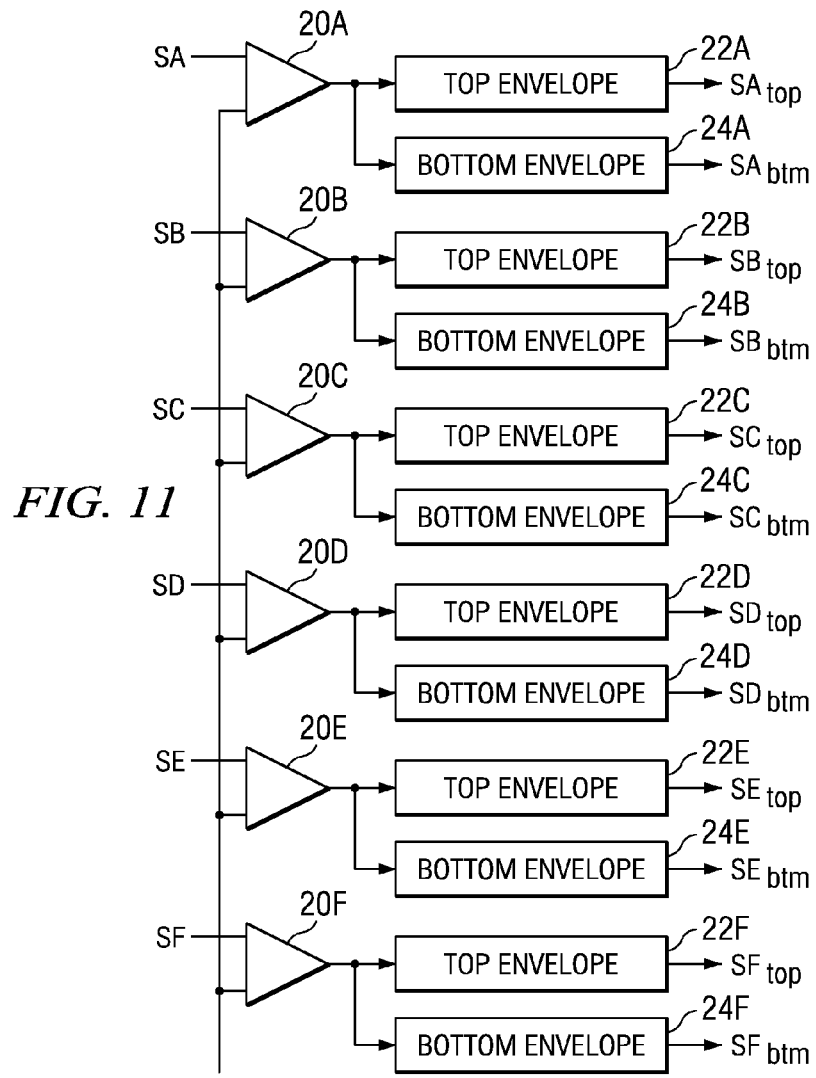
FIG. 11 is a block diagram illustrating an example of a configuration of an envelope detecting unit usable in implementing the invention.

FIG. 11 shows the configuration of an implementation of an envelope detecting unit usable in the implementation. In this embodiment, a top envelope circuit 22 and a bottom envelope circuit 24 are used for the RF signal obtained from each light receiving region of the light detector. More specifically, the RF signal SA obtained from light receiving region A is input to top envelope circuit 22A and bottom envelope circuit 24A via gain control amplifier 20A. The RF signals SB, SC, SD, SE, SF obtained from the other light receiving regions B, C, D, E, F are likewise input to corresponding top envelope circuits 22B, 22C, 22D, 22E, 22F and bottom envelope circuits 24B, 24C, 24D, 24E, 24F via gain control amplifiers 20B, 20C, 20D, 20E, 20F, respectively.

With the same reference voltage Vc applied to light pick-up 14 used as a reference level, gain control amplifiers 20A–20F amplify the RF signals SA–SF at desired gains, respectively. As a result of this gain amplification, amplitude error depending on the type of optical disk can also be absorbed, and the reference level of the RF signals can be aligned with a prescribed value.

Top envelope circuits 22A–22F are, for example, comprised of capacitor-type peak hold circuits. They are used to detect the top envelopes of RF signals SA–SF and output top envelope signals SAtop–SFtop that express the top envelope waveforms, respectively. Each of the top envelope signals SAtop–SFtop essentially contains no RF signal component. The droop rate of the peak hold circuit in each top envelope circuit is set at such a value that it can follow the top envelope waveform of the RF signal. In particular, when optical disk 10 is inclined or the optical axis of the objective lens in pick-up 14 is deviated, since the top level of the RF signal oscillates, it is also possible to select an appropriate droop rate that can follow the oscillation waveform of the top level.

Bottom envelope circuits 24A–24F are, for example, comprised of capacitor type peak hold circuits. They are used to detect the bottom envelopes of RF signals SA–SF and output bottom envelope signals SAbtm–SFbtm that express the bottom envelope waveforms, respectively. Each of the bottom envelope signals SAbtm–SFbtm essentially contains no RF signal component. The droop rate of the peak hold circuit in each bottom envelope circuit is set at an appropriate value so that it can follow the bottom envelope waveform of the RF signal, and especially so that it can effectively follow the tracking modulation component during droop jump.

Figure 12:
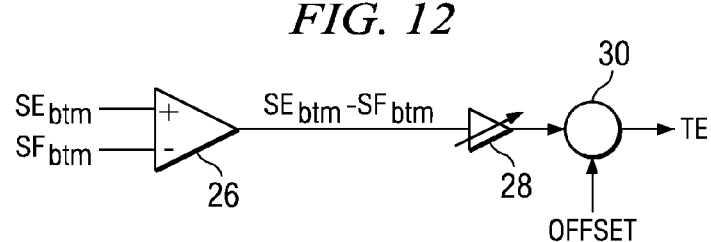
FIG. 12 is a block diagram illustrating an example of an embodiment of a tracking error detecting circuit.
Figure 13A:
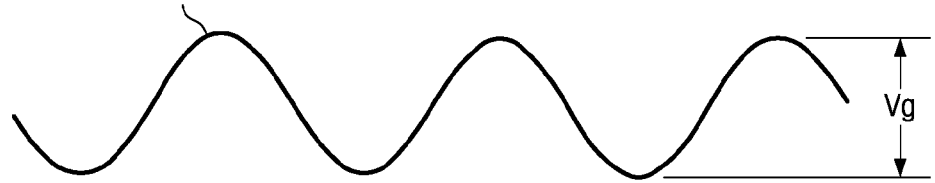
FIGS. 13A–13C are waveform diagrams illustrating the operation of the tracking error detecting circuit of FIG. 12.
Figure 13B:
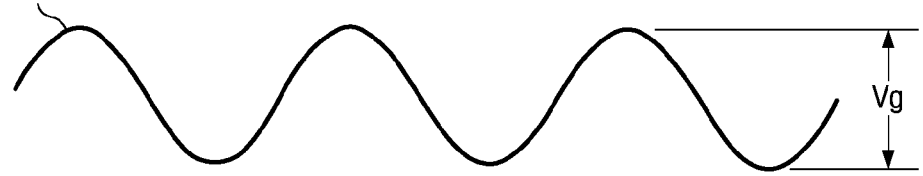
Figure 13C:
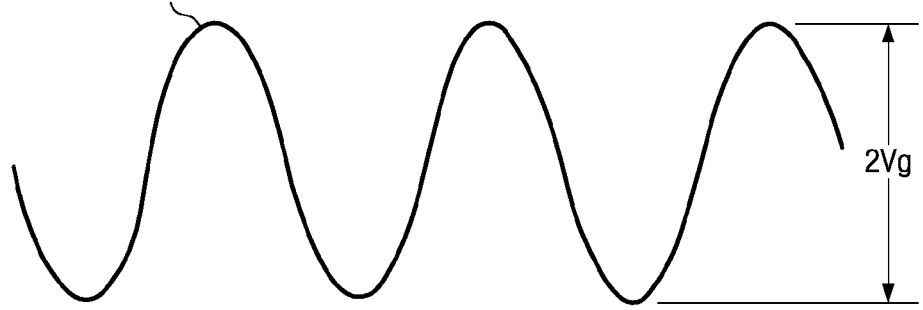

FIG. 12 shows the configuration of an embodiment of the tracking error detecting circuit. The servo error detecting circuit has subtracter 26, gain control amplifier 28, and offset circuit 30. The bottom envelope signals SEbtm and SFbtm output from bottom envelope circuits 24E and 24F corresponding to the light receiving regions E and F of the light detector (FIG. 10) are input into subtracter 26, which outputs a difference signal (SEbtm−SFbtm) that indicates the difference between the two input signals SEbtm and SFbtm. The difference signal (SEbtm−SFbtm) essentially contains no RF signal component. As shown in FIGS. 13A–13C, since the two bottom envelope signals SEbtm and SFbtm have opposite phases, the peak-to-peak value of the difference signal (SEbtm−SFbtm) is doubled.

Basically, the difference signal (SEbtm−SFbtm) output from subtracter 26 can be used as the tracking error signal for a three-beam system. In this embodiment, the difference signal passes through gain control amplifier 28 and offset circuit 30 sequentially, where the signal is subjected to gain adjustment and offset adjustment for the tracking error. Then, the signal is output as tracking error signal TE and is supplied to an A/D converter (not shown in the figure) in a later stage. For example, if the input range of the A/D converter is 2 V, the amplitude of the tracking error signal TE is amplified to about 1.5 V by gain control amplifier 28. Since the tracking error signal TE essentially contains no RF signal component and the SN ratio is high, a good waveform can be maintained even after amplification. In this way, a highly accurate tracking error signal can be obtained. It is also possible to pass the tracking error signal TE through a low-pass filter or anti-aliasing circuitry (not shown in the figure) before inputting it into the A/D converter.

Figure 14:
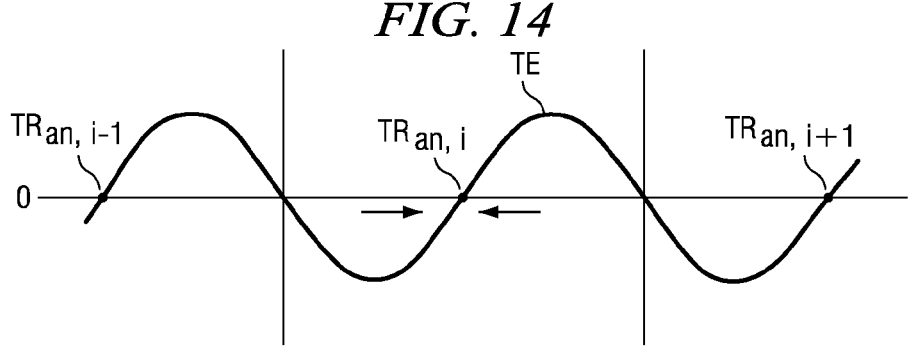
FIG. 14 is a diagram illustrating the tracking servo method.

During track jump, as shown in FIG. 14, tracking servo is performed with the tracking error signal TE used as a feedback signal after entering an interval of 180° before and after the desired on-track position TRon, i. According to this embodiment, since the accuracy of the tracking error signal TE is high, the beam spot can be shifted to the targeted track quickly and correctly.

FIG. 15 shows the configuration of another embodiment of the tracking error detecting circuit. In this figure, the parts with similar configuration and function as those of the tracking error detecting circuit shown in FIG. 12 are represented by the same symbols, respectively.

The tracking error detecting circuit has a circuit used for compensating the offset corresponding to the change in the top level of each RF signal SE and SF. The offset compensating circuit is comprised of coefficient multipliers 32, 34 and subtracters 36, 38.

More specifically, the bottom envelope signal SEbtm output from bottom envelope circuit 24E is input to the positive input terminal of subtracter 36, while the top envelope signal SEtop output from top envelope circuit 22E is input to coefficient multiplier 32. The output signal K•SEtop of coefficient multiplier 32 is supplied to the negative input terminal of subtracter 36. In this case, K is a multiplication coefficient set in coefficient multiplier 32. Subtracter 36 calculates the difference between the two input signals and outputs the different signal (SEbtm−K•SEtop) as compensated bottom envelope signal SEbtm'.

Also, the bottom envelope signal SFbtm output from bottom envelope circuit 24F is input to the positive input terminal of subtracter 38, while the top envelope signal SFtop output from top circuit 22F is input to coefficient multiplier 34. The output signal K•SFtop of coefficient multiplier 34 is supplied to the negative input terminal of subtracter 38. The same multiplication coefficient K as that of coefficient multiplier 32 is set in coefficient multiplier 34. Subtracter 38 calculates the difference between the two input signals and outputs the difference signal (SFbtm−K•SFtop) as corrected bottom envelope signal SFbtm'.

For the RF signal, when the top level oscillates, as shown in FIGS. 16A–16C, the oscillation component also affects the bottom level. As a result, an offset corresponding to the oscillation of the top level appears in the tracking modulation component Ste on the bottom side. In this embodiment, the top level change Stw in the RF signal is separated in the state of top envelope signal Stop. The signal K•SFtop obtained by multiplying an appropriate coefficient K with top envelope signal Stop is used as the offset component, which is subtracted from bottom envelope signal Sbtm. In this way, offset of the tracking modulation component Ste corresponding to the top level change Stw is cancelled out.

In this way, in FIG. 15, both the corrected bottom envelope signals SEbtm' and SFbtm' output from subtracters 36 and 38 almost contain no RF signal component, and influence (offset) of the top level can be eliminated. Consequently, there is almost no RF signal component in the finally obtained tracking error signal TE, and the influence of the top level can be eliminated.

In this embodiment, there is also a circuit used for adjusting the frequency characteristic of the tracking error signal TE. The frequency characteristic adjusting circuit is comprised of subtracter 40, equalizer 42, and gain control amplifier 44. Subtracter 40 calculates the difference between the two bottom envelope signals SEbtm and SFbtm and outputs the difference signal (SEbtm−SFbtm) as alignment signal AL. Equalizer 42 emphasizes (amplifies) or attenuates the desired frequency band component to change the frequency characteristic of the alignment signal AL. After the gain of the alignment signal AL with the desired frequency characteristic is adjusted by gain control amplifier 44, the signal is added by adder 46 to basic tracking error signal (SEbtm'−SFbtm') output from subtracter 26. Since the alignment signal AL essentially contains no RF signal component, the frequency characteristic of the tracking error signal TE can be adjusted without lowering SN.

Figure 17:
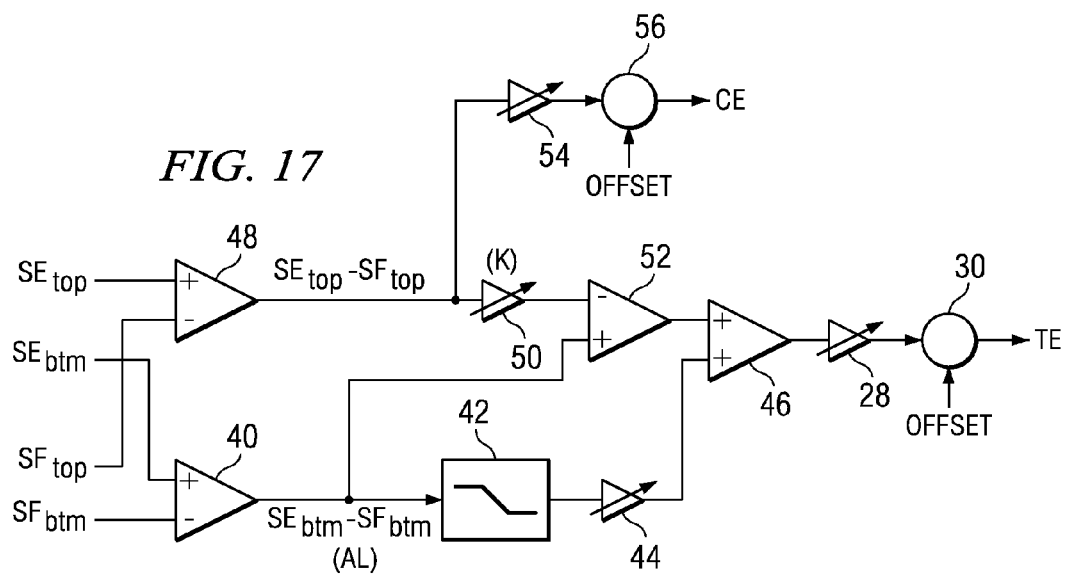
FIG. 17 is a block diagram illustrating an example of another embodiment of a tracking error detecting circuit.

FIG. 17 shows the configuration of another embodiment of the tracking error detecting circuit. In this embodiment, even if the circuit has a smaller scale, the same tracking error signal TE as that of the tracking error detecting circuit shown in FIG. 15 can be obtained. The tracking error detecting circuit not only inputs difference signal (SEbtm−SFbtm) obtained at the output terminal of subtracter 40 as alignment signal AL to equalizer 42 but also inputs the signal as a basic tracking error signal to the positive input terminal of subtracter 52. On the other hand, the difference between the two top envelope signals SEtop and SFtop is calculated by subtracter 48 to generate difference signal (SEtop−SFtop). The signal K(SEtop−SFtop) obtained by multiplying coefficient K with the difference signal with coefficient multiplier 50 is input to the negative input terminal of subtracter 52. Said subtracter 52 calculates the difference between the two input signals by means of subtraction and outputs difference signal {(SEbtm−SFbtm)−K(SEtop−SFtop)}. The following equation (1) shows that the output of this subtracter 52 is equivalent to the output of subtracter 26 in the tracking error detecting circuit shown in FIG. 15.

$$(SEbtm-SFbtm)-K(SEtop-SFtop)=(SEbtm-K \cdot SEtop)-(SFbtm-K \cdot SFtop) \quad (1)$$

In the embodiment shown in FIG. 17, a center error detecting circuit is comprised of subtracter 48, gain control amplifier 54, and offset circuit 56. Subtracter 48 is shared with the tracking error detecting circuit. It calculates the difference between two top envelope signals SEtop and SFtop and outputs the difference signal (SEtop−SFtop). The difference signal (SEtop−SFtop) passes through gain control amplifier 54 and offset circuit 56, where gain adjustment and offset adjustment used for the center error are performed for the signal. The obtained signal is then supplied as a center error signal CE to an A/D converter (not shown in the figure) in a later stage. The center error signal CE essentially contains no RF signal component. It can be used as a servo error signal that indicates the positional error of light pick-up 14 in the radial direction.

Figure 18:
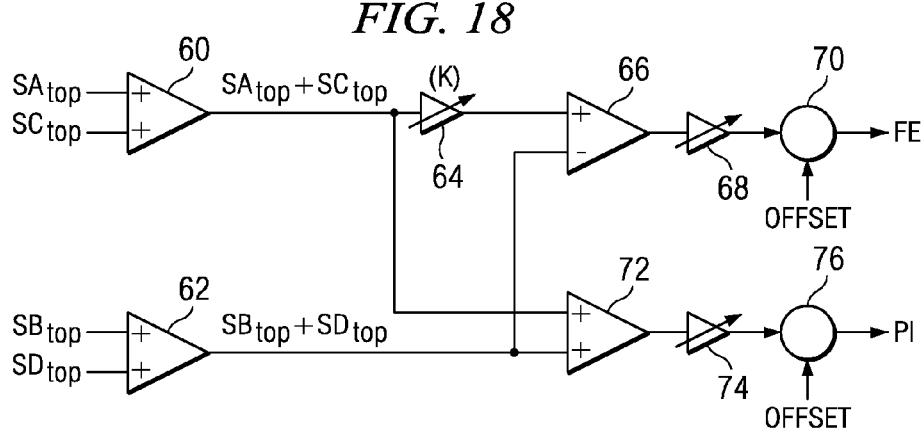
FIG. 18 is a block diagram illustrating an example of an embodiment of a focus error detecting circuit.

FIG. 18 shows the configuration of an embodiment of a focus error detecting circuit and a pull-in detecting circuit.

The focus error detecting circuit is comprised of adders 60, 62, coefficient multiplier 64, subtracter 66, gain control amplifier 68, and offset circuit 70. Adder 60 receives the inputs of top envelope signals SAtop and SCtop output from top envelope circuits 22A and 22C corresponding to light receiving regions A and C, calculates the sum of the two input signals, and outputs the sum signal (SAtop+SCtop). The sum signal (SAtop+SCtop) is multiplied with a desired coefficient K in coefficient multiplier 64 and is then input to the positive input terminal of subtracter 66. The other adder 62 receives the inputs of top envelope signals SBtop and SDtop output from top envelope circuits 22B and 22D corresponding to light receiving regions B and D, calculates the sum of the two input signals, and outputs the sum signal (SBtop+SDtop). The sum signal (SBtop+SDtop) is input to the negative input terminal of subtracter 66. Subtracter 66 calculates the difference between the two input signals and outputs difference signal {K(SAtop+SCtop)−(SBtop+SDtop)}. Basically, the difference signal output from subtracter 66 can be used as the focus error signal. In this embodiment, the difference signal passes through amplifier 68 and offset circuit 70, where the gain adjustment and offset adjustment used for the focus error FE are performed for the signal. The obtained signal is supplied to an A/D converter (not shown in the figure) in a later stage. It is also possible to omit coefficient multiplier 64 and input the output of adder 60 directly to subtracter 66.

In the astigmatism method, if the objective lens in pick-up 14 is too close to disk 10 (see FIG. 1), the levels of the RF signals SA and SC generated from light receiving regions A and C in the light detector are higher than those of the RF signals SB and SD generated from light receiving regions B and D. The focus error signal FE is offset to the positive side. On the other hand, if the objective lens in pick-up 14 is too far away from disk 10, the levels of RF signals SB and SD are higher than those of RF signals SA and SC, and the focus error signal FE is offset to the negative side. In this way, focusing servo is performed appropriately so that the level of focus error signal FE approaches zero. In this embodiment, since the focus error signal FE essentially contains no RF signal component and the SN ratio is high, highly-accurate focusing servo can be performed.

In FIG. 18, the pull-in circuit is comprised of adders 60, 62, adder 72, gain control amplifier 74, and offset circuit 76. Adders 60 and 62 are shared with the focus error detecting circuit. Adder 72 adds the signal (SAtop+SCtop) output from adder 60 to the signal (SBtop+SDtop) output from adder 62 and outputs the total sum signal (SAtop+SCtop+SBtop+SDtop). Basically, the total sum signal can be used as a pull-in signal. In this embodiment, the pull-in signal passes through gain control amplifier 74 and offset circuit 76, where the gain adjustment and offset adjustment used for pull-in are performed for the circuit. The obtained signal is output as a pull-in signal PI to an A/D converter (not shown in the figure) in a later stage.

The level of the pull-in signal PI changes corresponding to the distance between pick-up 14 and optical disk 10. In other words, as pick-up 14 is moved closer to optical disk 10, the levels of the RF signals SA, SB, SC, SD become higher. Therefore, the level of pull-in signal PI becomes higher. For example, during initialization immediately after the power is turned on, pick-up 14 can be moved closer to optical disk 10 with pull-in signal PI used as a monitor signal. Since the pull-in PI signal essentially contains no RF signal and the SN ratio is high, a stable and reliable pick-up starting operation can be performed.

Figure 19:
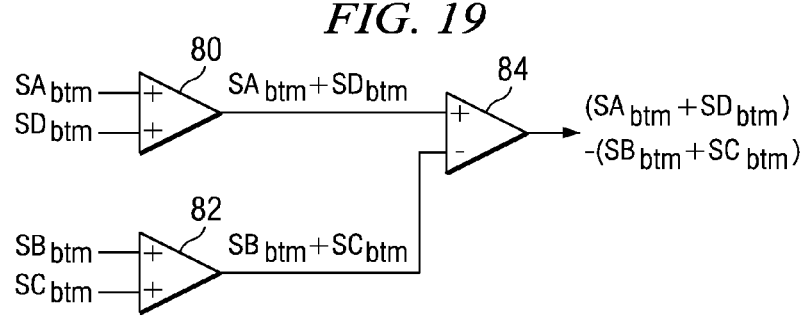
FIG. 19 is a block diagram illustrating an example of yet another embodiment of a tracking error detecting circuit.

FIG. 19 shows the configuration of another embodiment of the tracking error detecting circuit. In this embodiment, a four-division type light detector (with light receiving regions A, B, C, D as previously described) is used to generate a tracking error signal using the push-pull method. The tracking error detecting circuit has a pair of adders 80, 82 and subtracter 84.

The bottom envelope signals SAbtm and SDbtm obtained from bottom envelope circuits 24A and 24D (see FIG. 11) corresponding to the light receiving regions A and D of the light detector are input to adder 80, which outputs the sum signal (SAbtm+SDbtm) that indicates the sum of the two input signals. The sum signal (SAbtm+SDbtm) essentially contains no RF signal component. Also, since the two bottom envelope signals SAbtm and SDbtm are in phase, the peak-to-peak value of the sum signal (SAbtm+SDbtm) is doubled.

The bottom envelope signals SBbtm and SCbtm obtained from bottom envelope circuits 24B and 24C (FIG. 11) corresponding to the light receiving regions B and C of the light detector are input to another adder 82, which outputs the sum signal (SBbtm+SCbtm) that indicates the sum of the two input signals. The sum signal (SBbtm+SCbtm) essentially contains no RF signal component. Also, since the two bottom envelope signals SBbtm and SCbtm are in phase, the peak-to-peak value of the sum signal (SBbtm+SCbtm) is doubled.

The sum signal (SAbtm+SDbtm) output from adder 80 and the sum signal (SBbtm+SCbtm) output from adder 82 are input to the positive and negative terminals of subtracter 84, respectively. The subtracter outputs the difference signal {(SAbtm+SDbtm)−(SBbtm+SCbtm)} that indicates the difference between the two input signals. The difference signal essentially contains no RF signal component. Since the two sum signals (SAbtm+SDbtm) and (SBbtm+SCbtm) are out of phase, the peak-to-peak value of the difference signal is doubled.

Basically, the difference signal {(SAbtm+SDbtm)−(SBbtm+SCbtm)} output from subtracter 84 can be used as the tracking error signal of the push-pull system. However, it is also possible to supply the signal to an A/D converter (not shown in the figure) after passing it through a gain control amplifier, offset circuit, or low-pass filter (not shown in the figure).

Figure 20:
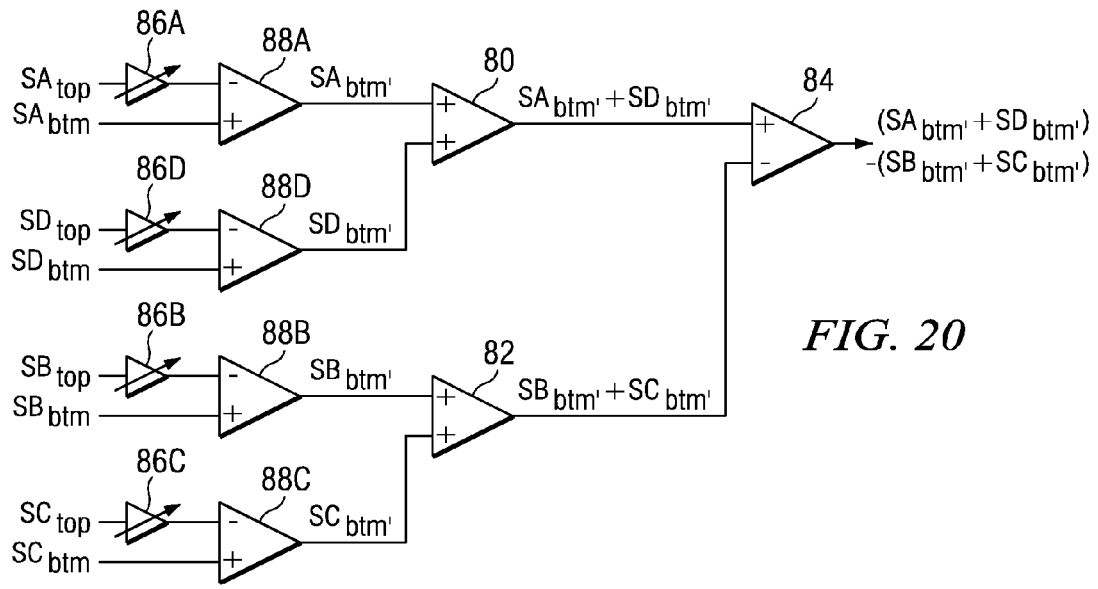
FIG. 20 is a block diagram illustrating an example of yet another embodiment of a tracking error detecting circuit.

FIG. 20 shows the configuration of a modification example of the tracking error detecting circuit shown in FIG. 19. This modification example has a circuit used for compensating the offset corresponding to the changes in the top levels of RF signals SA, SB, SC, SD. The offset compensating circuit is comprised of coefficient multipliers 86A, 86B, 86C, 86D that multiply coefficient K with top envelope signals SAtop, SDtop, SBtop, SCtop obtained from RF signals SA, SB, SC, SD, as well as subtracters 88A, 88B, 88C, 88D that calculate the differences between bottom envelope signals SAbtm, SDbtm, SBbtm, SCbtm and the output signals K•SAtop, K•SDtop, K•SBtop, K•SCtop of coefficient multipliers 86A, 86B, 86C, 86D.

Figure 21:
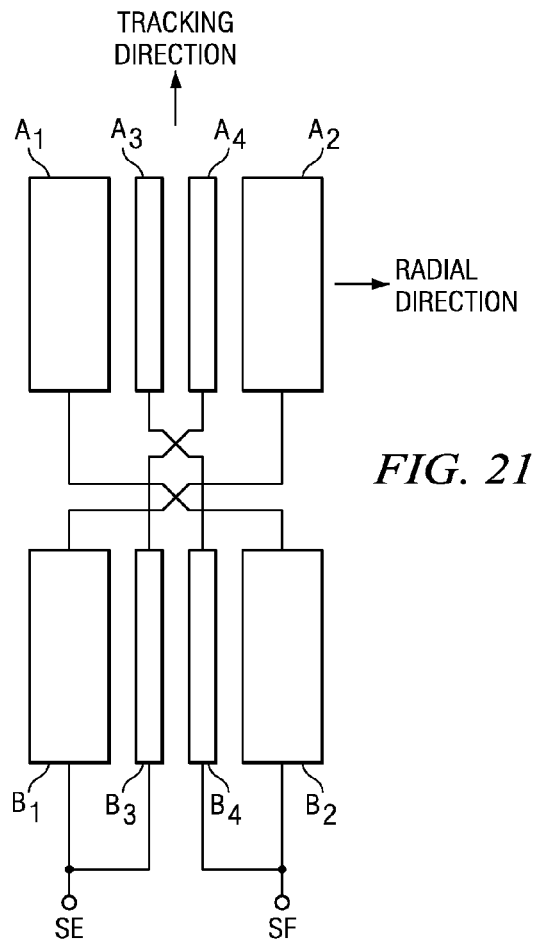
FIG. 21 is a schematic plan view illustrating an example of arrangement of light receiving regions of a light detector usable with described other servo error detecting device implementations of the invention.

FIG. 21 shows arrangement of light receiving regions of the light detector usable in connection with other implementations of the invention. The light receiving regions are arranged using the so-called top hold push-pull (TPP) method. The light beam reflected from the optical disk is first incident onto light receiving regions A1, A3, A4, A2 in a first optical stage. The light beam reflected in the first stage is incident onto light receiving regions B1, B3, B4, B2 in a second optical stage. In the first stage, the regions A1 and A3 on the left side are in phase, as are the regions A2 and A4 on the right side. The left-side regions A1, A3 and the right-side regions A2, A4 are out of phase. In the second stage, the regions B1 and B3 on the left side are in phase, as are the regions B2 and B4 on the right side. The left-side regions B 1, B3 and the right-side regions B4, B2 are out of phase. The left-side regions A1, A3 in the first stage and the right-side regions B2, B4 in the second stage are in phase. Also, the right-side regions A2, A4 in the first stage and the left-side regions B1, B3 in the second stage are in phase.

The light receiving regions A1, A3, A4, A2 in the first stage generate electric signals or RF signals SA1, SA3, SA4, SA2 corresponding to the quantity or intensity of the received light. These RF signals may be voltage signals obtained as a result of I–V conversion performed in pick-up 14. The level of a reference voltage Vc applied as a bias voltage from outside to the pick-up is used as the reference.

Figure 22:
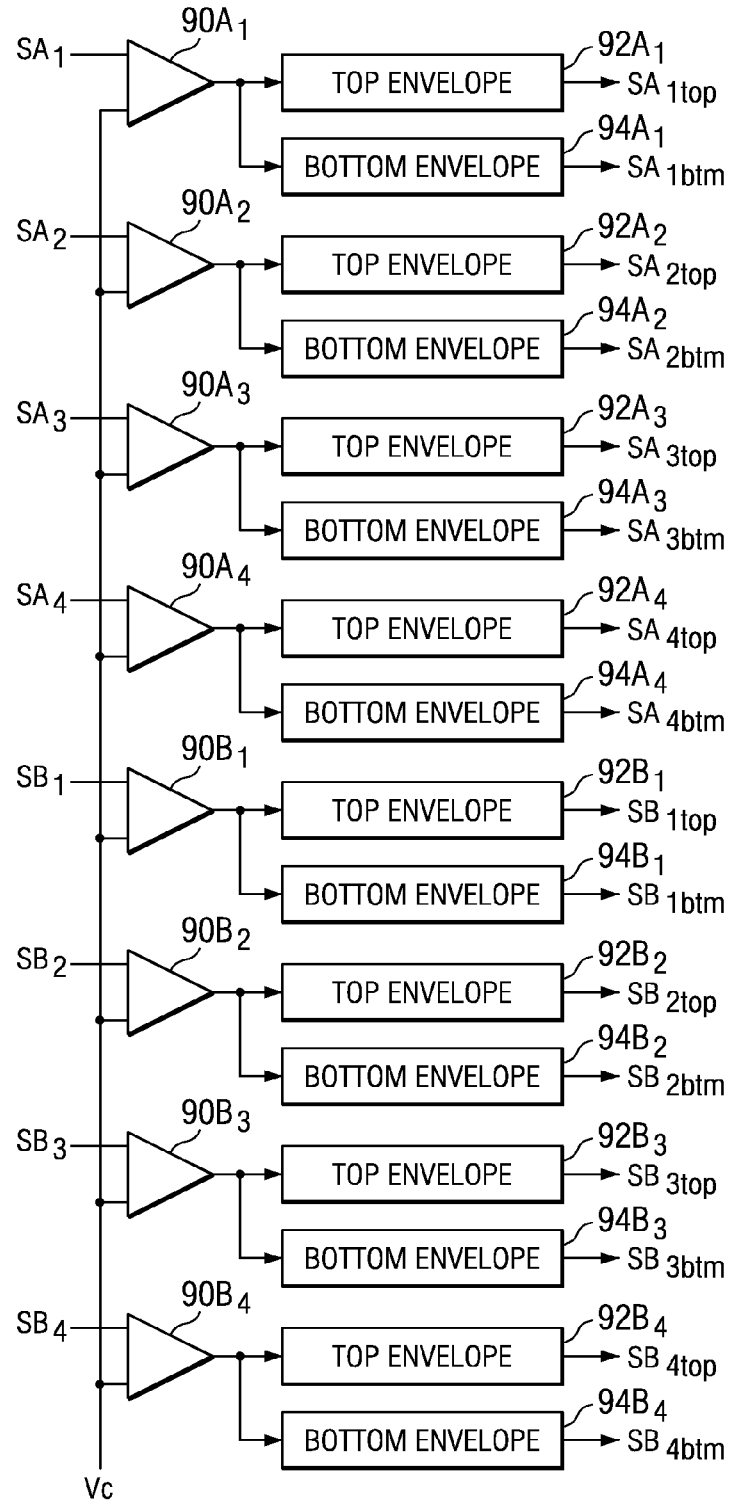
FIG. 22 is a block diagram illustrating an example of another configuration of an envelope detecting unit usable in implementing the invention.

FIG. 22 shows the configuration of an envelope detecting unit that can be used for the light receiving regions of FIG. 21. In this configuration, a top envelope circuit 92 and a bottom envelope circuit 94 are used for the RF signal obtained from each light receiving region of the light detector. It is also possible to set these top envelope circuits 92 and bottom envelope circuits 94 in either RF amplifier 16 or light pick-up 14 (FIG. 1).

More specifically, the RF signals SA1, SA2, SA3, SA4 obtained from the light receiving regions A1, A2, A3, A4 in the first stage are input to top envelope circuits 92A1, 92A2, 92A3, 92A4 and bottom envelope circuits 94A1, 94A2, 94A3, 94A4 via gain control amplifiers 90A1, 90A2, 90A3, 90A4, respectively. The RF signals SB1, SB2, SB3, SB4 obtained from the light receiving regions B1, B2, B3, B4 in the second stage are input to top envelope circuits 92B1, 92B2 92B3, 92B4 and bottom envelope circuits 94B1, 94B2, 94B3, 94B4 via gain control amplifiers 90B1, 90B2, 90B3, 90B4, respectively.

Top envelope circuits 92A1–92A4, 92B1–92B4, for example, are comprised of capacitor-type peak hold circuits. They can detect the top envelopes of RF signals SA1–SA4, SB1–SB4 and output signals SA1top–SA4top, SB1top–SB4top that express the respective top envelope waveforms. The droop rate of the peak hold circuit in each top envelope circuit is set at an appropriate value so that it can follow the top envelope waveform of the RF signal.

Bottom envelope circuits 94A1–94A4, 94B1–94B4, for example, are comprised of capacitor-type peak hold circuits. They can detect the bottom envelopes of RF signals SA1–SA4, SB1–SB4 and output signals SA1btm–SA4btm, SB1btm–SB4btm that express the respective bottom envelope waveforms. The droop rate of the peak hold circuit in each bottom envelope circuit is set at an appropriate value so that it can follow the bottom envelope waveform of the RF signal.

Figure 23:
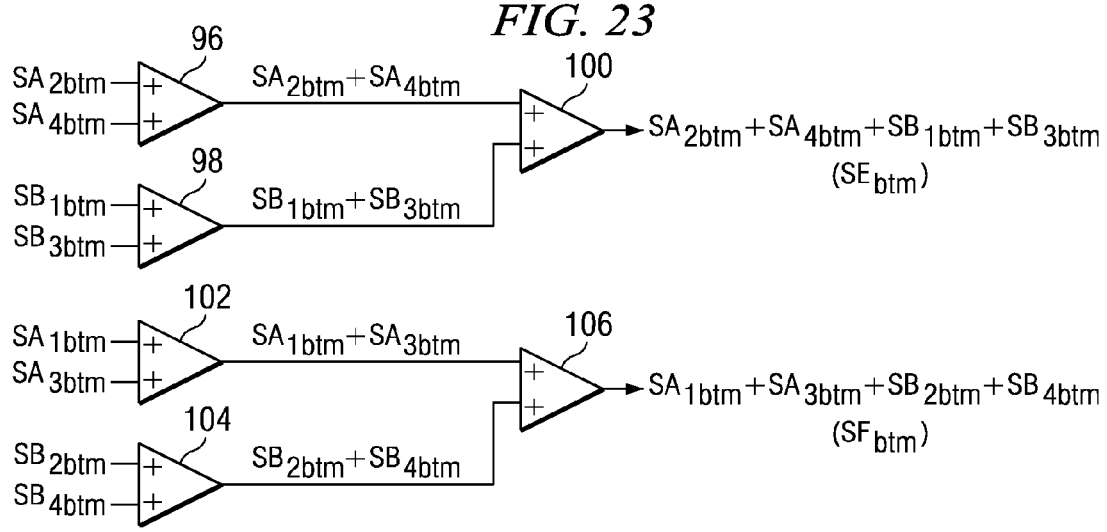
FIG. 23 is a block diagram illustrating an example an embodiment of a sum signal generating circuit.

FIG. 23 shows the configuration of an embodiment of a sum signal generating circuit. The first sum signal generating part comprises three adders 96, 98, and 100, which calculate the sum of the four in-phase bottom envelope signals SA2btm, SA4btm, SB1btm, SB3btm and output the sum signal (SA2btm+SA4btm+SB1btm+SB3btm) as the first bottom envelope sum signal SEbtm. The second sum signal generating part comprises three adders 102, 104, 106, which calculate the sum of the four in-phase bottom envelope signals SA1btm, SA3btm, SB2btm, SB4btm and output the sum signal (SA1btm+SA3btm+SB2btm+SB4btm) as the second bottom envelope sum signal SFbtm.

Both of the first and second bottom envelope signals SEbtm and SFbtm almost contain no RF signal component, and the tracking modulation components included in the RF signals are expressed at a high SN ratio. Consequently, when the two bottom envelope signals SEbtm and SFbtm are supplied, for example, to the tracking error detecting circuit shown in FIG. 12, a tracking error signal TE of the TPP method with a high SN ratio can be obtained according to the present invention.

On the other hand, a first top envelope sum signal SEtop (SA2top+SA4top+SB1top+SB3top) and a second top envelope sum signal SFtop (SA1top+SA3top+SB2top+SB4top) can also be obtained using the same sum signal generating circuit as that shown in FIG. 23. Consequently, it is also possible to use the tracking error detecting circuit shown in FIG. 15 or 17 with the first and second bottom sum signals SEbtm, SFbtm and the first and second top envelope sum signals SEtop, SFtop used as the input signals.

Figure 24:
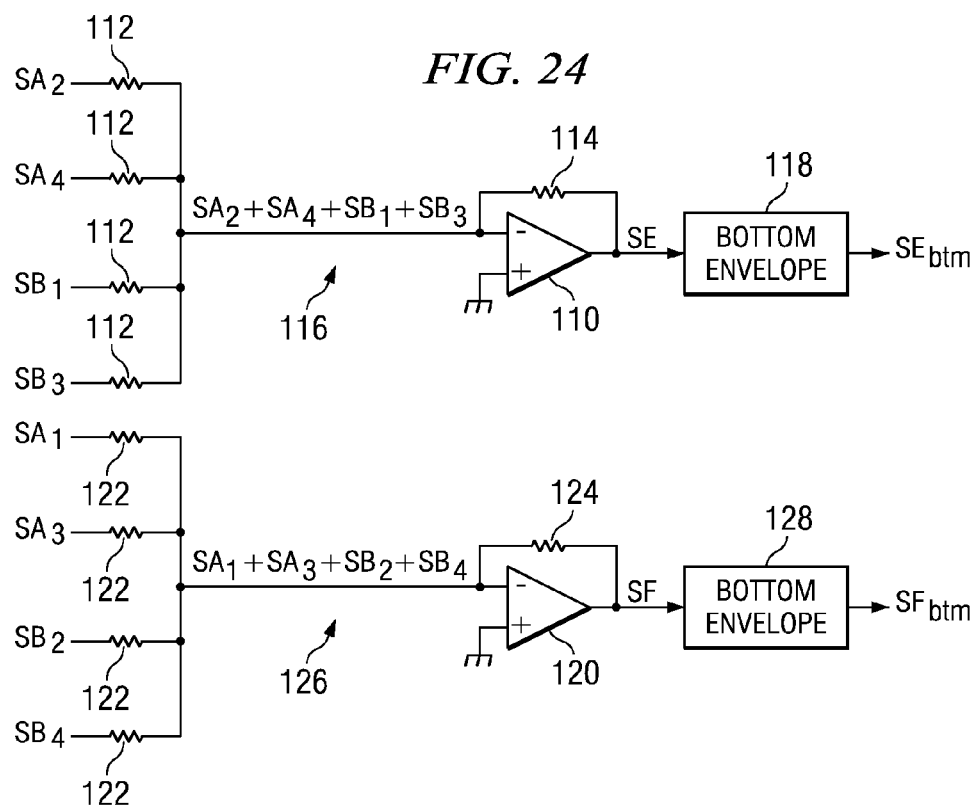
FIG. 24 is a block diagram illustrating an example of another embodiment of a sum signal generating circuit.

FIG. 24 shows the configuration of another embodiment of the sum signal generating circuit. The first sum signal generating part has a combining circuit 116, which is comprised of operational amplifier 110, input resistors 112, and feedback resistor 114, and a bottom envelope circuit 118. The combining circuit 116 calculates the sum of the RF signals SA2, SA4, SB1, SB3 obtained from light receiving regions A2, A4, B1, B3 that are in phase and outputs the sum signal (SA2+S4+SB1+SB3) as the first RF sum signal SE. Bottom envelope circuit 118 is comprised of a capacitor-type peak hold circuit. It detects the bottom envelope of sum signal SE and outputs a bottom envelope signal that expresses the bottom envelope waveform as the first bottom envelope sum signal SEbtm.

The second sum signal generating part has the same circuit configuration as the first sum signal generating part. The RF signals SA1, SA3, SB2, SB4 obtained from light receiving regions A1, A3, B2, B4 that are in phase are input to the sum signal generating part, which outputs the second RF sum signal SF (SA1+SA3+SB2+SB4) from combining circuit 126. The second bottom envelope signal SFbtm that expresses the bottom envelope waveform of the second RF sum signal SF is output from bottom envelope circuit 128.

Both of the first and second bottom envelope sum signals SEbtm and SFbtm almost contain no RF signal component and are essentially equivalent to the sum signals shown in FIG. 14. Consequently, they can be used as the input signals of the tracking error detecting circuit shown in FIG. 12, 15, or 17.

For top envelope signals, by connecting a first and a second top envelope circuit (not shown in the figure) to the outputs of combining circuits 116 and 126, the first top envelope sum signal SEtop that expresses the top envelope waveform of the first sum signal SE is output from the first envelope circuit, and the second top envelope sum signal SFtop that expresses the top envelope waveform of the second sum signal SF is output from the second envelope circuit. The first and second top envelope sum signals SEtop and SFtop can be used as the input signals of the tracking error detecting circuit shown in FIG. 15 or 17.

As described above, in the present invention, a top envelope and/or bottom envelope are/is extracted from the electric signals or RF signals obtained from the light pick-up or light detector. The RF signal components can be effectively cut off to obtain highly-accurate servo error signals with excellent SN characteristics by performing a required processing for the extracted top envelope and/or bottom envelope. Also, since the required signal components contained in the RF signals required for various types of servo can be converted to low-frequency signals without lowering their levels, there is no need to use a high frequency band circuit.

In the following, real waveform models are used to explain the difference between the system of the present invention that extracts a bottom envelope from an RF signal and a conventional system that simply passes an RF signal through a low-pass filter from the aspect of the frequency spectrum obtained by means of Fourier transformation.

Figure 25A:
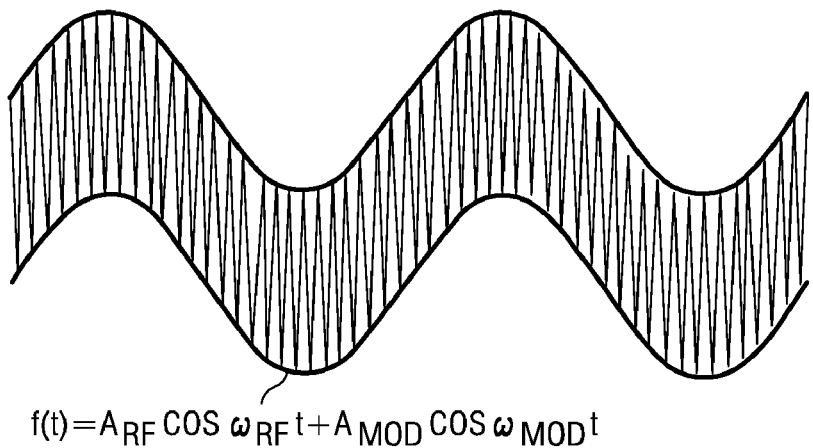
FIGS. 25A and 25B are a waveform diagram and a frequency spectrum diagram illustrating a model used for explaining a system of the present invention.

First, as shown in FIG. 25A, a model obtained by simply overlapping a low-frequency modulation component MOD(t) (envelope component) with an RF signal RF(t) with a constant amplitude is taken into consideration. Signal f(t) of this model is defined by equation (2).

$$f(t) = RF(t) + MOD(t) \quad (2)$$
$$= A_{RF}\cos\omega_{RF}t + A_{MOD}\cos\omega_{MOD}t$$

In this case, $A_{RF}$ and $\omega_{RF}$ represent the amplitude and frequency of RF signal RF(t), respectively. $A_{MOD}$ and $\omega_{MOD}$ represent the amplitude and frequency of the low-frequency modulation component MOD(t), respectively. When Fourier transformation is performed, said equation (2) becomes the following equation (3). The integration interval of each integration symbol $\int$ is $-\infty - +\infty$.

$$H(j\omega) = \int f(t)e^{-j\omega t}dt \quad (3)$$
$$= \int A_{RF}(e^{j\omega_{RF}t} + e^{-j\omega_{RF}t})/2 \cdot e^{-j\omega t}dt +$$
$$\int A_{MOD}(e^{j\omega_{MOD}t} + e^{-j\omega_{MOD}t})/2 \cdot e^{-j\omega t}dt$$
$$= A_{RF}/2 \cdot \int e^{-j(\omega-\omega_{RF})t}dt + A_{RF}/2 \cdot \int e^{-j(\omega+\omega_{RF})t}dt +$$

-continued
$$A_{MOD}/2 \cdot \int e^{-j(\omega-\omega_{MOD})t}dt + A_{MOD}/2 \cdot \int e^{-j(\omega+\omega_{MOD})t}dt$$
$$= \pi A_{RF}\delta(\omega - \omega_{RF}) + \pi A_{RF}\delta(\omega + \omega_{RF}) +$$
$$\pi A_{MOD}\delta(\omega - \omega_{MOD}) + \pi A_{MOD}\delta(\omega + \omega_{MOD})$$

Figure 25B:
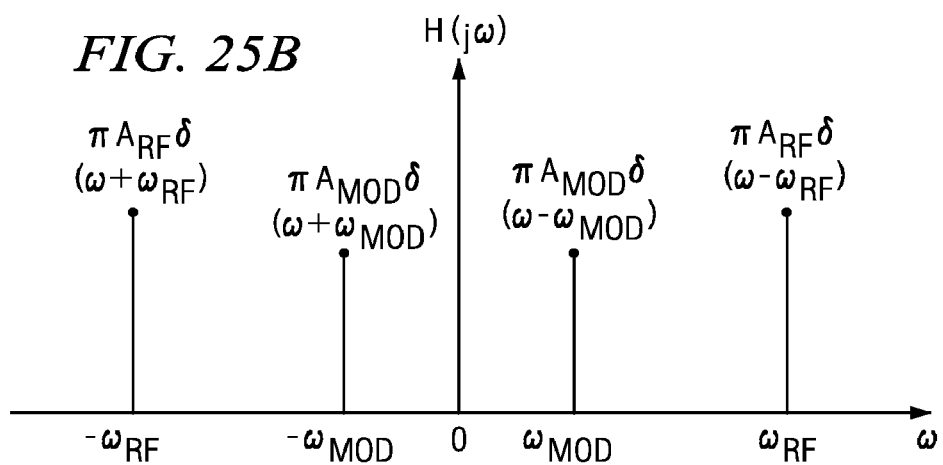

FIG. 25B shows the frequency spectrum of model signal f(t) obtained as a result of the Fourier transformation.

Figure 26A:
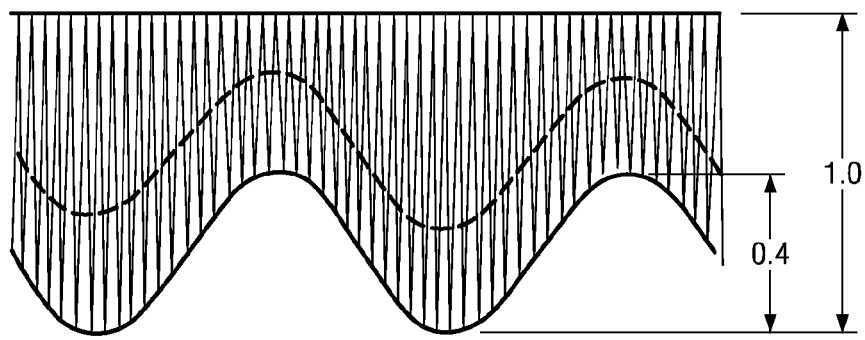
FIGS. 26A and 26B are a waveform diagram and a frequency spectrum diagram illustrating a model used for explaining a conventional system.

Then, as shown in FIG. 26A, a model of bottom modulation obtained by overlapping a low-frequency modulation component MOD(t) with only the bottom side of an RF signal RF(t) with a constant amplitude is taken into consideration. Signal f(t) of this model is defined by the following equation (4).

$$f(t) = RF(t) \times (1 - MOD(t)) + A_{RF}MOD(t) \quad (4)$$
$$= A_{RF}\cos\omega_{RF}t \times (1 - A_{MOD}\cos\omega_{MOD}t) +$$
$$A_{RF} \times A_{MOD}\cos\omega_{MOD}t$$

In equation (4), $A_{RF}$ and $\omega_{RF}$ represent the amplitude and frequency of RF signal RF(t), respectively, $A_{MOD}$ and $\omega_{MOD}$ represent the amplitude and frequency of the low-frequency modulation component MOD(t), respectively. When Fourier transformation is performed, said equation (4) becomes the following equation (5). The integration interval of each integration symbol $\int$ is $-\infty - +\infty$.

$$H(j\omega) = \int A_{RF}(e^{j\omega_{RF}t} + e^{-j\omega_{RF}t})/2 \cdot e^{-j\omega t}dt - \quad (5)$$
$$\int A_{RF}(e^{j\omega_{RF}t} + e^{-j\omega_{RF}t})/2 \cdot A_{MOD}(e^{j\omega_{MOD}t} +$$
$$e^{-j\omega_{MOD}t})/2 \cdot e^{-j\omega t}dt +$$
$$\int A_{RF}A_{MOD}(e^{j\omega_{MOD}t} + e^{-j\omega_{MOD}t})/2 \cdot e^{-j\omega t}dt$$
$$= A_{RF}/2 \cdot \int e^{-j(\omega-\omega_{RF})t}dt + A_{RF}/2 \cdot \int e^{-j(\omega+\omega_{RF})t}dt -$$
$$A_{RF}/2 \cdot A_{MOD}/2 \cdot \int e^{-j(\omega-\omega_{RF}-\omega_{MOD})t}dt +$$
$$\int e^{-j(\omega-\omega_{RF}+\omega_{MOD})t} + A_{RF}A_{MOD}/2 \cdot \int e^{-j(\omega-\omega_{MOD})t}dt +$$
$$A_{RF}A_{MOD}/2 \cdot \int e^{-j(\omega+\omega_{MOD})t}dt$$
$$= \pi A_{RF}\delta(\omega - \omega_{RF}) + \pi A_{RF}\delta(\omega + \omega_{RF}) -$$
$$\frac{1}{2} \cdot \{\pi A_{RF}A_{MOD}\delta(\omega - \omega_{RF} - \omega_{MOD}) +$$
$$\pi A_{RF}A_{MOD}\delta(\omega + \omega_{RF} + \omega_{MOD}) +$$
$$\pi A_{RF}A_{MOD}\delta(\omega + \omega_{RF} - \omega_{MOD}) +$$
$$\pi A_{RF}A_{MOD}\delta(\omega + \omega_{RF} + \omega_{MOD})\} +$$
$$\pi A_{RF}A_{MOD}\delta(\omega - \omega_{MOD}) + \pi A_{RF}A_{MOD}\delta(\omega + \omega_{MOD})$$

Figure 26B:
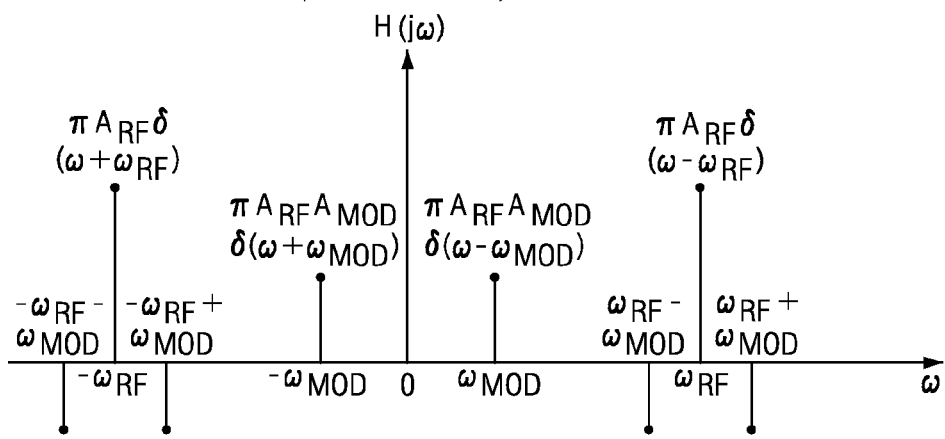

FIG. 26B shows the frequency spectrum of model signal f(t) obtained as a result of the Fourier transformation.

When specific values ($A_{RF}$=1/2, $A_{MOD}$=0.4/2) are substituted into the equation to compare each coefficient, the following is obtained.

$$f(t) = RF(t) \times (1 - MOD(t)) + A_{RF} MOD(t) \quad (6)$$
$$= 1/2 \cdot \cos\omega_{RF} t \times (1 - 1/2 \cdot \cos\omega_{MOD} t) +$$
$$1/2 \cdot 0.4/2 \cdot \cos\omega_{MOD} t$$
$$= 0.5\cos\omega_{RF} t(1 - 0.2\cos\omega_{MOD} t) + 0.1\cos\omega_{MOD} t$$
$$H(j\omega) = 0.5\pi\delta(\omega - \omega_{RF}) + 0.5\pi\delta(\omega + \omega_{RF}) -$$
$$\{0.05\pi\delta(\omega - \omega_{RF} - \omega_{MOD}) +$$
$$0.05\pi\delta(\omega + \omega_{RF} + \omega_{MOD}) +$$
$$0.05\pi\delta(\omega + \omega_{RF} - \omega_{MOD}) +$$
$$0.05\pi\delta(\omega + \omega_{RF} + \omega_{MOD})\} +$$
$$0.1\pi\delta(\omega - \omega_{MOD}) + 0.1\pi\delta(\omega + \omega_{MOD})$$

On the other hand, when Fourier transformation is performed directly for 0.4/2 cos ωt (bottom envelope component in FIG. 26A), the following is obtained.

$$H(j\omega) = 0.2\pi\delta(\omega - \omega_{MOD}) + 0.2\pi\delta(\omega + \omega_{MOD}) \quad (7)$$

As can be seen from equations (6) and (7), in a conventional system and the system of the present invention, the amplitude of $\omega_{MOD}$ spectrum has a relationship of 0.1 and 0.2, that is, a ratio of 1:2.

The embodiments described above pertain to a servo error signal generating circuit for generating tracking error signal, focus error signal, center error signal, and pull-in signal. The present invention, however, is not limited to the servo error signal generating circuits described in these embodiments. It is applicable to circuits and servo error detecting systems for generating various types of servo error signals. Also, the technologies used in the present invention may have various modifications. In particular, the light detecting means, envelope detecting means, and operation means are not limited to those described above. Other systems or configurations can also be adopted.

In the present invention, the envelope component is extracted from an RF signal without passing the RF signal through a low-pass filter, and a tracking error signal is obtained from the extracted envelope component. Therefore, the signal component is not attenuated. As a result, the SN ratio can be increased compared with that in a conventional method.

As explained above, by using the servo error detecting device for an optical disk disclosed in the present invention, the high-frequency component can be effectively cut off to obtain a highly-accurate servo error signal with an excellent SN characteristic.

Those skilled in the art to which the invention relates will appreciate that yet other substitutions and modifications may be made to the described embodiments, without departing from the spirit and scope of the invention and set forth in the description and the claims.

The invention claimed is:

1. A servo error detector for an optical disk having a signal recording side, comprising:
   an optical detector for receiving light reflected from the signal recording side of the optical disk in multiple light receiving regions and generating electric signals corresponding to the light intensity of the reflected light in each of the light receiving regions,
   an envelope detector for detecting the top envelope and bottom envelope of each of the electric signals and generating a top envelope signal and a bottom envelope signal for each of the electric signals, and
   a servo error signal generator circuit for processing the top envelope signals and bottom envelope signals to generate a servo error signal,
   wherein the servo error signal generating circuit calculates the difference between the bottom envelope signal obtained from a first light receiving region and the bottom envelope signal obtained from a second light receiving region to generate an alignment signal, calculates the difference between the top envelope signal obtained from the first light receiving region and the top envelope signal obtained from the second light receiving region to generate a top envelope difference signal, calculates the difference between the alignment signal and the top envelope difference signal to generate a first difference signal, equalizes the alignment signal, and combines the first difference signal and the equalized alignment signal to generate the servo error signal.

2. The servo error detector of claim 1, wherein the servo error signal generating circuit processes the top envelope difference signal to generate a center error signal.

* * * * *